United States Patent

Larson et al.

[11] Patent Number: 5,105,495
[45] Date of Patent: Apr. 21, 1992

[54] AIRPLANE LOADING BRIDGE

[75] Inventors: James Larson, East Hills; Roy Mack, Mineola, both of N.Y.

[73] Assignee: Bridgetech Services Corp., Brentwood, N.Y.

[21] Appl. No.: 568,360

[22] Filed: Aug. 15, 1990

[51] Int. Cl.⁵ .................................. F01D 1/00
[52] U.S. Cl. .................................... 14/71.5
[58] Field of Search ............... 14/71.1, 71.3, 71.5, 14/71.7

[56] References Cited

U.S. PATENT DOCUMENTS

| | | | |
|---|---|---|---|
| 3,543,318 | 12/1970 | Tushim | 14/71.5 |
| 3,606,626 | 9/1971 | Eggert, Jr. | 14/71.5 |
| 3,683,440 | 8/1972 | Xenakis et al. | 14/71.5 |
| 3,694,724 | 9/1972 | Eggert, Jr. | 14/71.5 X |
| 3,913,757 | 10/1975 | Lovey | 14/71.5 X |
| 4,112,958 | 9/1978 | Anderberg | 14/71.5 X |
| 4,559,660 | 12/1985 | Lichti | 14/71.5 |
| 4,817,223 | 4/1989 | Koch | 14/71.1 |

Primary Examiner—William P. Neuder
Attorney, Agent, or Firm—Bauer & Schaffer

[57] ABSTRACT

An array of non-contact proximity sensors are mounted on the front bumper of the loading bridge to be in opposition to the airplane. The proximity sensors are interconnected to circuitry, and the approach speed of the gangway to the airplane is reduced automatically as it nears the airplane. The sensors and circuitry sense angular misalignment of the gangway with the airplane and selectively and automatically control its position relative to the airplane.

8 Claims, 2 Drawing Sheets

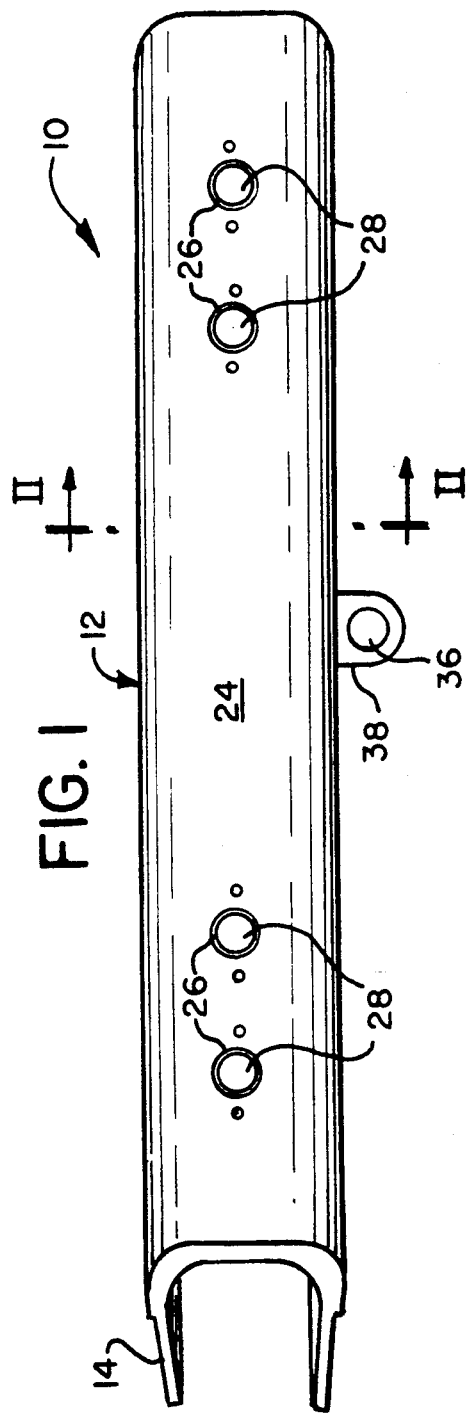
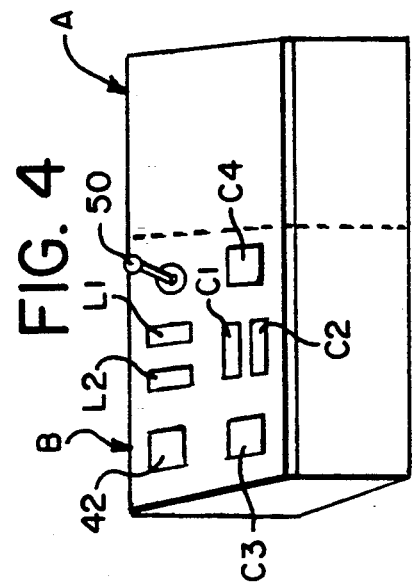
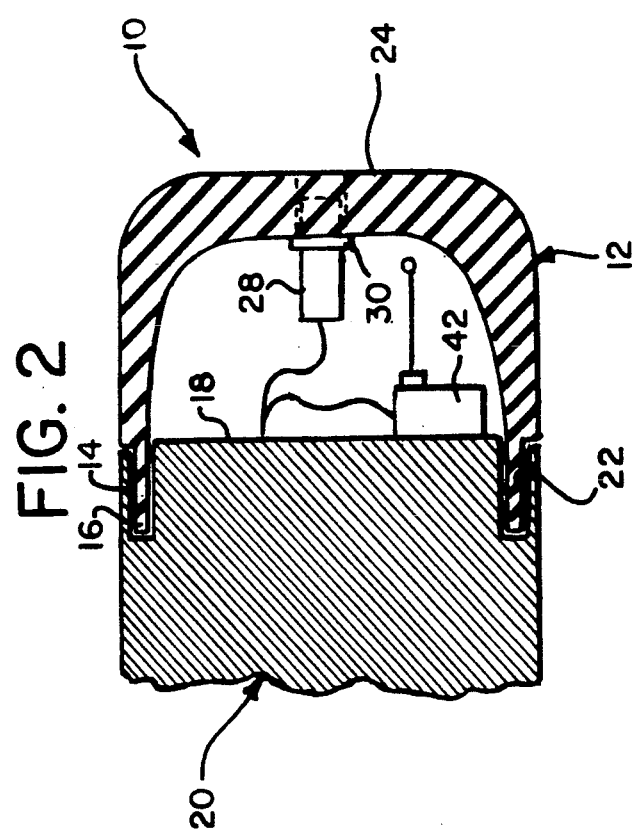

AIRPLANE LOADING BRIDGE

BACKGROUND

The present invention relates to the improvement of airplane loading bridges, gangways, or the like and, in particular, to a gangway for loading and unloading airplanes.

Examples of airplane gangways are shown in U.S. Pat. No. 3,644,952 and in applicant's copending applications, Ser. No. 423,810, filed Oct. 18, 1989, entitled "Weatherproof and Fireproof Loading Bridge Canopy", and Ser. No. 503,877, filed Apr. 3, 1980, entitled "Standardized Control Console for Loading Bridge". The conventional gangway is essentially a moveable, articulable corridor which, when docked to an airplane, provides a pathway for the loading and unloading of passengers, cargo, and contents of the airplane. Because aircraft have various different locations for their doorways and different contours of the surrounding fusilage and due to imprecise parking of the craft at the loading gate, the position of the door to the gate will also vary. Proper abutment of the gangway against the aircraft is crucial to the safe loading and unloading of the aircraft.

The process of abutting the gangway against the aircraft involves considerable risk of inflicting damage to the fragile structure and fusilage of the aircraft from the massive gangway structure driven by powerful motors.

The prior art attempted to ameliorate the problem through the use of flexible and/or resilient material for the abutting parts of the gangway so as to isolate and cushion the more rigid gangway structure. The prior art also teaches the use of steering position indicators and contact limit switch driven indicators as feedback to the operators to guide them in their task. While these devices perform adequately when used by a competent, experienced, and attentive operator, ideal circumstances are often not the situation in practice. Therefore, a need exists for a system which assures proper docking of a gangway against an airplane and also a system which actively and automatically aids in the task through affirmative interaction of the various motors and control circuits which move and position the gangway.

It is an object of the present invention to provide a gangway and control apparatus which overcomes the aforementioned problems and which assures proper docking of the gangway squarely against the aircraft body so as to enhance the safe loading and unloading thereof.

It is a further object of the present invention to provide a gangway and control apparatus which senses the conditions of engagement of a gangway approaching an airplane and, based upon the conditions sensed, disables and/or enables one or more motor functions, which thus results in no damage to the aircraft.

Other objects, advantages, and features of the present invention will be apparent to those skilled in the art from the accompanying illustrations and descriptions.

SUMMARY OF THE INVENTION

According to the present invention, the forward edge of the gangway floor is provided with a resilient bumper in which is provided a plurality of non-contact proximity sensors adapted to provide a signal (or an absence of one) depending on the selected spacing of the bumper from the surface of the airplane. The proximity sensors are interconnected with the controls of the motors, providing movement for the gangway so as to provide automatic control thereover.

Preferably, the non-contact proximity sensors are embedded within the bumper behind its frontal aspect or contact surface with the airplace and are spaced selectively along the length of the bumper so as to sense and indicate any misalignment of the bumper relative to the airplane. The interconnected circuitry is also provided with means for correcting such misalignment by allowing combined operation of those motors which will permit the steering of the gangway into its proper position.

The non-contact proximity switches are quite sensitive in short ranges and, therefore, can be reserved for use in the control of the gangway only when the gangway is within inches of the airplane. Thus, the present system will not interfere with the initial speed or direction of travel of the gangway and does not modify the overall loading or unloading of the airplane.

The non-contact proximity sensors may be further augmented by a second type of non-contact proximity switch having a range substantially larger than the first sensors so that the gross spacing of the gangway from the airplane ca be detected and used to control the speed of the gangway.

Full details of the present invention are set forth in the following description and are illustrated in the accompanying drawings.

DESCRIPTION OF THE DRAWINGS

FIG. 1 is a frontal view of a gangway bumper embodying the present invention;

FIG. 2 is a sectional view taken along line II—II of FIG. 1;

FIG. 4 is an illustration of a control panel used by the operator.

DETAILED DESCRIPTION OF THE INVENTION

Figure 3:
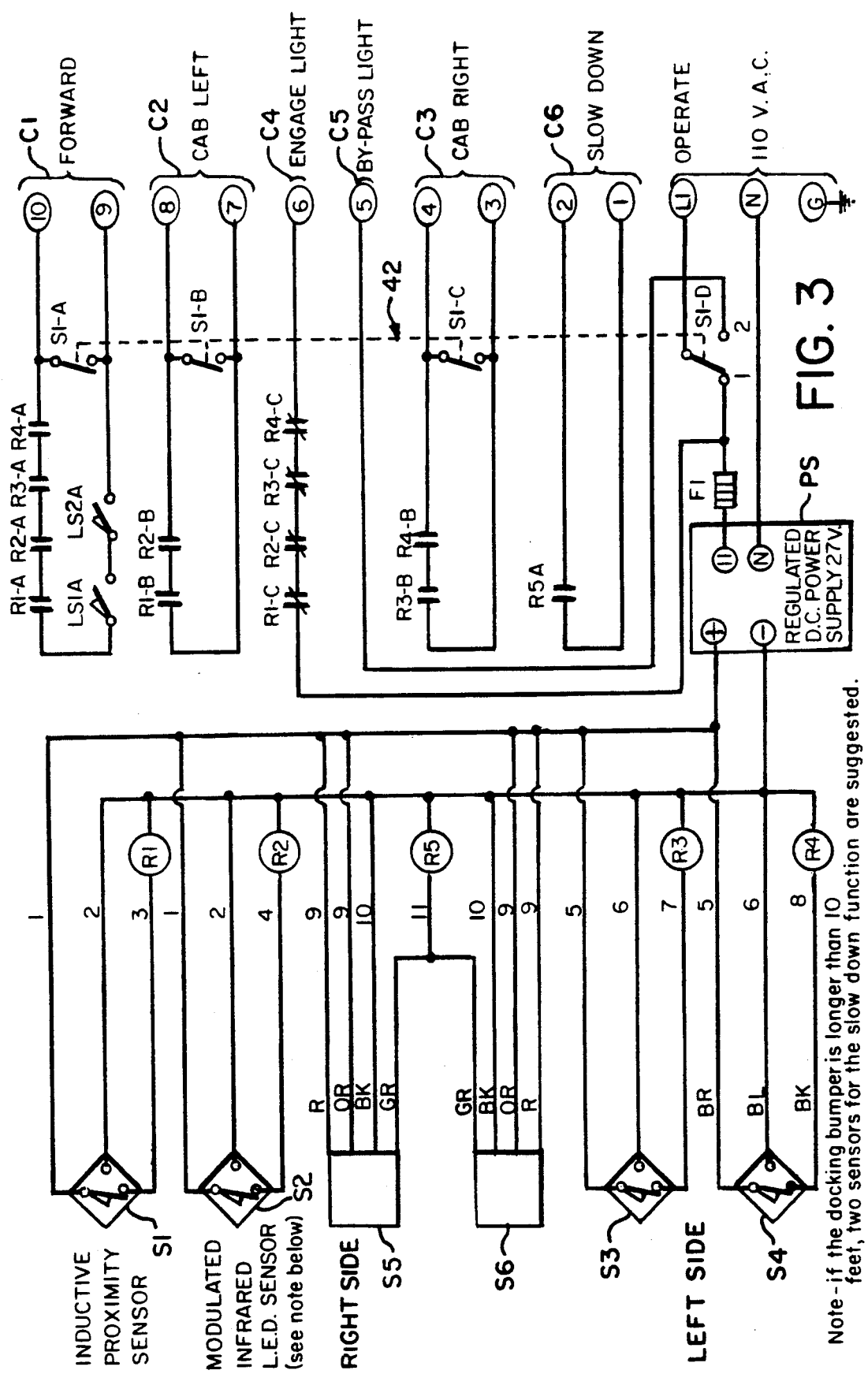
FIG. 3 is an electrical schematic diagram of the control circuits for interconnection to the conventional drive control circuitry.

Referring now to FIG. 1 and FIG. 2, the gangway bumper embodying the present invention is generally denoted by the numeral 10. The bumper 10 comprises an elongated body 12 made of a flexible, resilient material such as rubber or plastics, having a hollow substantially C-shaped cross section. The body 12 is provided with recesses or undercuts 14 along the end of the top and bottom free edges to provide mounting surfaces 16 for removable securement to the forward edge 18 of the gangway floor 20 when mounted. Preferably, the edge 18 of the gangway floor is also undercut or provided with a receiving slot 22 for the free edges of the bumper. This feature serves to minimize the transitional step of the interface of the gangway and bumper so that the interface does not tend to catch the shoes of persons using the gangway and so that the wheels of wagons, hand trucks, and like equipment used to load and unload the aircraft do not become trapped or stopped by such a step. The body 12 of the bumper may be mounted to the gangway floor 20 by any suitable fastening means such as screws, nuts and bolts, or adhesive bonding.

Omitted from the drawings but obvious to those skilled in this art are the wheel and undercarriage means for movably supporting the front end of the gangway (the rear end, of course, is fixed to the passenger terminal building). The gangway is provided with wheel drive means for forwardly extending the gangway, steering the wheels to the right and left, and controlling the speed of movement as well as other functions such as adjusting the height of the gangway relative to the ground. Reference can be made to the aforementioned patent and applications or to the conventional and standard loading bridges in use, which references are incorporated here as if more fully set forth.

The forward aspect or face 24 of the bumper body 12 is provided with a selective number of holes 26, in each of which is mounted a non-conract inductive proximity sensor 28. The sensors 28 are mounted by one or more brackets 30, affixed by pins, adhesive, screws, or the like to the inner surface of the bumper body 12. The proximity sensor manufactured by the Allan Bradley Corporation, Model No. 871C, is preferable since it has a threaded exterior body as well as the proper parameters for the use herein as having a predetermined short sensitivity range of less than two inches. Thus the brackets 30 may easily be provided with threaded holes receiving the sensor bodies so that the position of the "eye" of the sensor, relative to the outer face 24 of the bumper body 12, can be relatively adjusted. This adjustment also provides the amount of distance sensitivity the sensor has to the surface of the airplane. It will of course, be apparent that other means for adjustably mounting the sensors 28 can be used and/or other types of proximity sensors can be used.

As seen, the sensors 28 are arrayed in two sets of pairs, one set adjacent each of the longitudinal ends of the bumper 10. Each sensor is normally closed and adjusted to change state or condition on sensing an aircraft or other objects at between ⅜ to 1 inch distance. Each sensor is also provided with a relay R1, R2, R3, and R4, respectively, which is activated by the passage of current through the associated sensor, i.e. upon supplying line current to a regulated power supply PS.

Each of the relays is provided with several output contacts A, B, C, and D, which are selectively wired together in series in one or more control circuits C1-C6, as seen in FIG. 3, so that system integrity or fail-safe operation will be provided in the event of the failure of any one of the sensors.

The control circuits C1-C6 are integrated serially in the normal operating control circuits for the gangway such as that shown in the earlier mentioned references. In the present system as seen in FIG. 3, the sensors 28, here denoted as S1, S2, S3, and S4, powered by a DC Power Supply PS, drive their output relays R1, R2, R4, and R4. The corresponding contacts R1A, R2A, R3A, and R4A (now also closed) are wired serially into a forward motion enable circuit C1/BF so as to maintain the circuit C1 normally closed. The enable circuit C1/BF is connected into standard forward drive control circuit for the gangway wheels. When the gangway approaches the aircraft, within the critical range, one or more sensors change state, dropping the associated relay and thus causing one or more of the contacts R1A, R2A, R3A, and R4A to open so that circuit C1/BF is opened. The forward motion of the gangway is thus automatically disabled. Action of any one of the sensors S1-S4 causes the immediate cessation of forward movement, thus protecting both the aircraft and gangway from damage that would almost certainly result from advancing the gangway while only a fraction of an inch away from the aircraft.

The sensors S1, S2, S3 and S4 are also wired into discrete left and right channels, each channel providing a serial link to the left and right steering enable circuits C2 and C3 via contacts R1B, R2B, R3B, and R4B. respectively, which are connected into the standard steering control circuit. These circuits not only avoid damage to equipment by preventing steering of the gangway in the wrong direction but also serve to aid in the angular alignment of the gangway with the aircraft. Thus, for example, if the left corner of the bumper touches the aircraft first, sensors S3 and S4 will be triggered, resulting in a change of state of relays R3 and R4. Initially, circuit C1/BF will be interrupted, and forward motion of the gangway will be disabled, thus preventing the gangway as a whole from being driven further into the aircraft fusilage merely to correct nonalignment of the right side. Simultaneously, the gangway right drive circuit C3 will also be automatically disabled via contacts R3B and R4B, allowing the gangway to be steered only on the left to effect alignment of the gangway with the aircraft. Similar operation is effected if the opposite side sensor drop out.

The disabling of the circuits is fail-safe since each of the relays and contacts are normally (without current) in an open state. Thus, if for any reason current is interrupted such as by power failure, sensor opening, or other component failure, the appropriate circuit will disable.

Two indicator light circuits C4 and C5 are provided. The first light circuit indicates that the system is engaged and is provided with a light L1 connected the power line Li so as to be normally lit upon turning on power. Arranged in series in this circuit are normally closed contacts R1C, R2C, R3C, and R4C of the sensor relays R1, R2, R3, and R4, respectively. Thus, should any one of the sensors change state by sensing the aircraft or any other relay or relay contact dropout, the engaged light Li is extinguished, and the system as a whole disengages.

Returning to FIG. 1, the present system may also employ a second type of distance sensor 36, having a predetermined range of sensitivity greater than that of sensors 28. The second distance sensor 36 may be mounted at any position on the front aspect of the gangway so as to be normally directed toward the aircraft. One or more of these sensors 36 may be spaced as desired. In the embodiment illustrated, a sensor 36 is mounted on a bracket 38 at the bottom of bumper 12, midway of its ends so as to face the forward direction. While many conventional distance sensors can be adapted to this application, the preferred embodiment employs a distance sensor of the pulsed infrared type, manufactured by Electronics Corporation of America, Photoswitch Division, Waltham, Mass., Type 42SRP, Low Voltage DC long range (Series 6000). With this unit the presence of the aircraft may be reliably detected at a distance of approximately 1 ½-2 feet. Other infrared pulse sensors having longer ranges may be used if desired.

As seen in FIG. 3, when the long range distance sensor 36 is triggered by the presence of an airplane at the approximate distance of 1½-2 feet, relay R5 is energized by sensor circuits S5 and S6 as a result of which a low speed gangway motor drive circuit C6 is then automatically completed via contact of relay R5A. The high speed gangway drive motor circuit in the standard cab control is thus overridden or disabled, allowing the operator to fine-position the gangway in small increments, as is appropriate when the gangway is already very close to an airplane. This feature also reduces the likelihood and severity of damage which might otherwise occur because this automatic selection of low speed operation prevents the massive gangway from developing excessive momentum. The automatic low speed selection circuit C6 thus makes operator reflexes and reaction time less critical and provides a greater margin of safety within which to work by establishing at least a two-step downgrade in the approach speed of the gangway to the airplane. If desired, additional gross distance sensors may be spaced along the bumper.

Also, if desired, FIG. 1 shows that an overtravel limit switches 40 may be used. The overtravel limit switch such as a wiskered microswitch may be mounted inside the bumper body 10, or on its exterior, at each end. The limit switches 38 are normally closed and have contacts LS1 and LS2 respectively in the forward drive enable circuit C1/BF as shown in FIG. 3.

The limit switches 40 are intended to account for unforeseen gross accident, as when the airplane itself unexpectedly and quickly veers from its stopped position, or when a ground vehicle enters the sphere of the gangway.

A separate override push button switch 42 is also provided. The switch 42 has open, single throw contacts S1A, S1B, and S1C, respectively in each of the motor drive and steering enabling circuits C1, C2, and C3 (forward, left, and right). The contacts S1A, S1B, and S1C are wired in parallel in the circuits so that when closed, by-pass the disable signals from the sensors. This allows overriding of interruptions in the forward motion and steering enable circuits as might be generated by a faulty or improperly adjusted distance sensor, limit switch, or distance sensor output relay, thereby facilitating the setup, repair, and adjustment of the inventive system.

The push button switch has a fourth contact S1D mounted in the power line. Contact S1D is a double throw contact, having one throw (1) normally closed so as to maintain the line power to the power source during operation. The second throw (2) is normally open but closed upon activation of the push button to remove the power source from the line current and close the second lamp circuit C5, lighing lamp L2 to indicate that the system is working on by-pass only.

In FIG. 4 an illustrated control panel is shown, where the normal or standard controls, shown in applicant's aforementioned application, Ser. No. 503,877, might be contained with the block denoted by the letter A and where the controls and/or indicators described in connection with the present invention are denoted by the letter B. Thus, in addition to the lights L1 and L2 and the override switch 42, the panel will contain indicator lights for the enable circuits C1, C2, C3, and C4 and a control switch 50. This provides the operator with ready access to all the controls.

It will be observed that the use of non-contact proximity sensors enable the provision of an effective and simple control system for the final stages of the docking process of an airplane loading bridge that such sensors may be easily wired integrally with the standard control and drive circuits without any substantial increase in costs. The employment of two different types of sensors enables a step-down in speed from a high speed approach to the final docking.

Various changes, modifications, and variations have been described, and others will be obvious to those skilled in this art. Thus, it is intended that the present description is to be taken as being illustrative and not limiting of the present invention.

What is claimed is:

1. In an airplane loading bridge, having a gangway provided with motor means for moving the front end of the gangway toward the airplane and motor means for selectively steering the front end of the gangway to the right and left, respectively, the improvement comprising a resilient bumper mounted on the front edge of said gangway, at least one non-contact inductive proximity sensor mounted within said bumper adjacent each extremity of the front edge of the gangway, each of said proximity sensors having a predetermined range at which the presence of a metallic object such as an airplane is sensed and means responsive to the sensing of the presence of said object to deactivate the motor means effecting forward motion of the gangway and to deactivate the motor means effecting steering on the side opposite from the sensing sensor.

2. The improvement according to claim 1, wherein said non-contact proximity switches are arranged at each end of said bumper in pairs and are electrically connected in series with said motor means for moving said gangway forward and separately with the motor means for steering the gangway right and left.

3. The improvement according to claim 1, wherein said non-contact proximity sensors are adjustably mounted in said bumper to sense the presence of aircraft at a distance of about ⅜ to about ½ inch from the face of said bumper.

4. An airplane loading bridge comprising a gangway having a rear end secured to a fixed member, a front end and an articulated body movable toward and away from a parked airplane, means for movably supporting the gangway at its front end, said means including a forward motion control circuit and right and left motion control circuits, respectively,
 a resilient bumper attached to the forward edge of the front end of said gangway,
 a first non-contact proximity sensor mounted in said bumper adjacent each of the lateral ends thereof and arranged with respect to the face of said bumper to detect the presence of an aircraft at a predetermined distance in front of said bumper, and
 circuit means interconnected with the existing gangway forward, left, and right motion control circuits, said circuit means interrupting said forward motion control circuits of the gangway when one or more of said sensors detect the presence of an aircraft so that forward motion of the gangway is arrested, said circuit means further interrupting said gangway left and right motion control circuits, depending upon which of said sensors detect the aircraft.

5. The loading bridge according to claim 4, including a gangway speed control circuit, a second non-contact proximity sensor mounted on said bumper between said first non-contact proximity sensor adapted to sense the presence of an object at a distance substantially greater than said first non-contact proximity sensor and circuit means interconnected with said gangway speed control circuit so that the speed of movement of said gangway is automatically reduced prior to the effectiveness of said first non-contact proximity.

6. The apparatus according to claim 4, wherein said circuit means has one or more interrupt override switches, said override switches being connected in said circuit means so that one or more of the gangway forward, left, and right motion control circuits can be restored to an operative status despite the existance of any circuit disablement generated by said circuit means.

7. The apparatus according to claim 4, wherein said circuit means is adapted to control a left indicator light and a right indicator light, the control of the indicator lights being dependent upon activation status of said side distance sensors.

8. The apparatus according to claim 4, wherein said sensors are inductive proximity probes, and said central distance sensor is a modulated reflective infrared sensor.

* * * * *